(12) United States Patent
McClain et al.

(10) Patent No.: US 12,405,237 B2
(45) Date of Patent: Sep. 2, 2025

(54) PREDICTING CERAMIC COLLOIDAL SUSPENSION STABILITY FOR EXTRUSION-BASED ADDITIVE MANUFACTURING

(71) Applicant: The Johns Hopkins University, Baltimore, MD (US)

(72) Inventors: Collin C. McClain, Columbia, MD (US); Michael P. Hunt, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 167 days.

(21) Appl. No.: 18/477,718

(22) Filed: Sep. 29, 2023

(65) Prior Publication Data

US 2024/0192156 A1 Jun. 13, 2024

Related U.S. Application Data

(60) Provisional application No. 63/386,947, filed on Dec. 12, 2022.

(51) Int. Cl.
*G01N 24/08* (2006.01)
(52) U.S. Cl.
CPC ................ *G01N 24/085* (2013.01)

(58) Field of Classification Search
CPC .................................................. G01N 24/085
See application file for complete search history.

(56) References Cited

U.S. PATENT DOCUMENTS

| | | | |
|---|---|---|---|
| 8,314,618 B2 * | 11/2012 | Bieri .................. | G01R 33/50 |
| | | | 324/309 |
| 11,346,908 B2 * | 5/2022 | Yu ..................... | G01N 24/08 |
| 2021/0063330 A1 * | 3/2021 | Matviychuk .......... | G01N 24/08 |

* cited by examiner

*Primary Examiner* — Gregory H Curran
(74) *Attorney, Agent, or Firm* — Sung T. Kim

(57) ABSTRACT

A process for selecting an additive and/or solvent for a colloidal ceramic suspension includes measuring spin lattice T1 relaxation times by nuclear magnetic resonance for a ceramic-solvent pair and an additive-solvent pair, wherein the solvent is selected from a plurality of different solvents, and wherein the additive is selected from a plurality of different additives. The process includes determining a relaxation number for each of the ceramic-solvent pairs and the additive-solvent pairs from the spin lattice T1 relaxation times, wherein a higher relaxation number is indicative of strong affinity between the additive and solvent and between the ceramic and solvent. Additionally, the process includes selecting the additive and the solvent based on the relaxation number having the highest relaxation number for the colloidal ceramic suspension.

20 Claims, 16 Drawing Sheets

$F_B$= Brownian Force
$F_D$= Drag Force
$F_g$= Gravity Force $F_E$= Electrical Force
$F_{EDL}$= EDL Force
$F_{vdW}$= Van der Waals Force

PREDICTING CERAMIC COLLOIDAL SUSPENSION STABILITY FOR EXTRUSION-BASED ADDITIVE MANUFACTURING

CROSS-REFERENCE TO RELATED APPLICATIONS

This application claims the benefit of U.S. Provisional Patent Application Ser. No. 63/386,947, filed on Dec. 12, 2022, which is expressly incorporated by reference herein in its entirety.

STATEMENT REGARDING FEDERALLY SPONSORED RESEARCH OR DEVELOPMENT

This invention was made with Government support under Contract No. N00014-21-1-2669 awarded by the United States Department of the Navy. The Government has certain rights in the invention.

TECHNICAL FIELD

The present disclosure generally relates to methods for predicting ceramic colloidal suspension stability for extrusion-based additive manufacturing, and more particularly, to methods for predicting ceramic colloidal suspension stability with Hansen Solubility Parameters obtained from T1 stress-lattice relaxation times using nuclear magnetic resonance.

BACKGROUND

Ceramic processing using colloidal suspensions dates as far back as the use of clay for bricks and pottery. Since the 1980s when technology was sufficient to enable what is now referred to as three-dimensional (3D) printing, the introduction of ceramic additive manufacturing quickly followed and has led to extensive research in the ceramic field and how to fabricate ceramic structures that were previously considered impossible. With applications ranging from biomedical to aerospace benefiting from these advances, the demand continues to rise for new materials and geometries. However, one of the major challenges with additively manufacturing ceramic structures is repeatability. With variations in the feedstock powder (i.e., particle size, morphology, and the like) and processing (i.e., slip casting vs hot pressing), ceramics research struggles to find consistency between materials. This leads to extensive testing and screening of powders, mediums, dispersants, binders, plasticizers, defoamers, pH adjusting agents, and the like in an effort to find the ideal formulation. Of all the relationships between the different constituents that make up a slip or a paste, the media, ceramic powder, and dispersant components are the most critical. The dispersant is generally considered integral for stabilizing the ceramic powder in a medium. If any of the percentages are off for the different components, the ceramic will sediment, resulting in less than ideal rheology during processing or a variation in density after drying the additively manufactured ceramic structure. For example, an extrusion based additive manufacturing process such as direct ink write (DIW) is an ink- or paste-based printing process that extrudes a highly loaded viscous ceramic paste through a nozzle at ambient temperature that solidifies onto a substrate upon drying in air. Suspension solidification and shape retention after deposition is induced by the pseudo-plastic to dilatant transition that occurs upon evaporation of the solvent. The use of a suitable dispersant, mostly acting by electrosteric repulsion, is essential to the formulation of a homogeneous, well-dispersed paste. Small amounts (0 to about 5 wt %) of other additives, such as a thickener, a plasticizer, a viscosiffer, and the like can be added to enhance suspension stability and impart specific desired rheological properties.

Achieving the desired rheology and performance of the ceramic feedstock in extrusion based additive manufacturing process is challenging. The higher solids loading colloidal systems are governed by a complex relationship between diffusion, electrostatics, and other interparticle forces as generally shown in Prior Art FIG. 1.

SUMMARY

Disclosed herein are processes for rapidly predicting ceramic colloidal suspension stability suitable for extrusion based additive manufacturing processes.

In one or more embodiments, a process for selecting an additive and/or solvent for a colloidal ceramic suspension includes measuring spin lattice T1 relaxation times by nuclear magnetic resonance for a ceramic-solvent pair and an additive-solvent pair, wherein the solvent is selected from a plurality of different solvents, and wherein the additive is selected from a plurality of different additives; determining a relaxation number for each of the ceramic-solvent pairs and the additive-solvent pairs from the spin lattice T1 relaxation times, wherein a higher relaxation number is indicative of strong affinity between the additive and solvent and between the ceramic and solvent; and selecting the additive and the solvent based on the relaxation number having the highest relaxation number for the colloidal ceramic suspension.

In one or more embodiments, a process for selecting solvents and/or additives in a ceramic colloidal suspension for an extrusion based additive manufacturing process includes measuring T1 relaxation times for mixtures comprising different solvents or additives with a ceramic by proton nuclear magnetic resonance, wherein each mixture comprises a ceramic-solvent pairing or a ceramic-additive pairing or a ceramic-additive-solvent pairing; determining a relaxation rate and a relaxation number for each mixture from the T1 relaxation times and ranking the relaxation numbers for each mixture based on an observed interaction, wherein the ranking for the observed interaction of a strong affinity has a lower rank than the observed interaction of a weaker affinity; calculating Hansen Solubility parameter values for the ceramic and each additive from the T1 relaxation times; and selecting the solvent and/or additive based on the respective Hansen solubility parameter value most closely matching the Hansen solubility parameter value for the ceramic.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Example embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

PRIOR ART FIG. 1 schematically illustrates various interparticle forces commonly observed in highly loaded colloidal systems.

PRIOR ART

DETAILED DESCRIPTION

Figure 1:
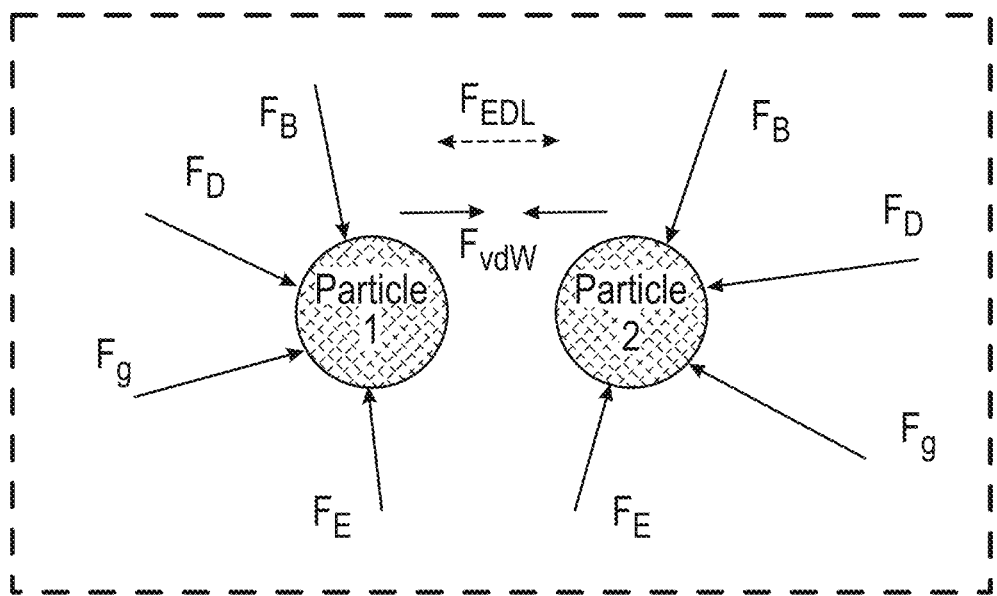

The present disclosure is generally directed to processes for predicting the stability of higher solids loading ceramic colloidal systems for use in extrusion based additive manufacturing process such as direct ink write (DIW) processes using Hansen Solubility Parameters (HSP) calculated from T1 stress-lattice relaxation times obtained using proton nuclear magnetic resonance (H-NMR), although other nuclei and isotopes could be used for determining the T1 relaxation times. Grading from unlike materials as opposed to like materials with different dispersants, pH needs, or solvent needs is a non-trivial challenge especially with high solids loading ceramic colloidal systems for use in extrusion based additive manufacturing processes such as DIW. Existing experimental approaches generally require slow/expensive tests.

The term "and/or" when used in a list of two or more items, means that any one of the listed items can be employed by itself or in combination with any one or more of the listed items. For example, the expression "A and/or B" is intended to mean either or both of A and B, i.e., A alone, B alone, or A and B in combination. The expression "A, B and/or C" is intended to mean A alone, B alone, C alone, A and B in combination, A and C in combination, B and C in combination or A, B, and C in combination.

In the present disclosure, ceramic suspension stability can be rapidly determined from the HSP values obtained for the dispersants (and/or other additives, e.g., binders, plasticizers, defoamers, pH adjusting agents, and/or the like) and ceramic particles based on the T1 relaxation times, which are also referred to as the spin-lattice relaxation time or longitudinal relation times, as captured by H-NMR.

The determination of the HSP values generally includes first determining the relaxation rate ($R_{rate}$), which is the inverse of the T1 values (1/T1). The $R_{rate}$ for the suspension ($R_{susp}$) and solvent of that suspension ($R_{solv}$) can then be used to determine a relaxation number ($R_{no}$) based on the following equation (I):

$$R_{no} = R_{susp}/R_{solv} - 1 \qquad (I)$$

It is important to note that when solving $R_{no}$ for ceramics such as $ZrO_2$ in solution, the $R_{solv}$ used is the relaxation rate of the additive (e.g., dispersant) in solution whereas $R_{solv}$ is the relaxation rate ($R_{ate}$) for the $ZrO_2$ in the solvent. When solving for $R_{no}$ with a ceramic in a solution, the $R_{solv}$ used is the $R_{rate}$ of the dispersant solution. Then, the $R_{no}$ for a given material is compared across multiple solvents, scored (where lower is better), and utilized in commercially available software to determine the Hansen solubility parameters. Solvents with a strong interaction with the ceramic result in a larger $R_{no}$ value for the suspension whereas a lower $R_{no}$ generally indicates a poor interaction resulting in instability.

The software for determining the HSP values, which is commercially available at www.hansensolubility.com/HSPiP (2019), generally automates the calculations by inputting the T1 values to find a region of good solvents as follows:

1. Order the $R_{no}$ values from smallest to largest for the range of solvents used;
2. Assign the three highest $R_{no}$ values a score of 1 (for strong affinity) with the rest being scored 2 (for weak affinity), for example. Alternatively, custom scoring on a larger scale can be utilized, e.g., 1-5, with different meanings for each;
3. Use the software to construct an initial Hansen sphere for the boundary between the strong and weak affinity solvents; and
4. Sequentially expand the number of solvents scores as a "1" until it is no longer possible to fit a spherical boundary between the strong and weak affinity solvents.

The use of the Hansen solubility parameters was previously developed for predicting whether one material would dissolve in another and form a solution, i.e., like dissolves like. The Hansen solubility parameters include the energy from dispersion forces between molecules ($\delta_d$); the energy from dipolar intermolecular forces between molecules ($\delta_p$); and the energy from hydrogen bonds between molecules ($\delta_h$) with respect to how the dispersants (or other additives) or ceramic particles interact with the various solvents.

The different parameters are then treated as coordinates for a point in a three-dimensional space commonly referred to as the Hansen space. The center of this "best-fit sphere" is the effective HSP for the particular material under investigation. The HSP locations of the final solvents with a score of "1" define the maximum value for the radius of the Hansen sphere. The closer the molecules are within this space, the more likely the molecules will dissolve into each other and form a solution. To determine if the parameters of two molecules (usually a solvent and a polymer) are within range, a value called interaction radius (Ra) is given to the substance being dissolved. This value determines the radius of the sphere in the Hansen space and its center is the three Hansen parameters. To calculate the distance (Ra) between Hansen parameters in the Hansen space, the following formula (II) can be used as defined in defined in *Hansen Solubility Parameters: A User's Handbook*, Charles M. Hansen, CRC Press, Boca Raton, Fla. 2007. $2^{nd}$ Ed.:

$$(Ra)^2 = 4(\delta_{d2}-\delta_{d1})^2 + (\delta_{p2}-\delta_{p1})^2 + (\delta_{h2}-\delta_{h1})^2 \qquad (II)$$

Combining this with the interaction radius $R_0$ provides the relative energy difference (RED) for the system, wherein $RED = R_a/R_0$. If RED is less than 1 the molecules are alike and will dissolve; if RED is equal to 1 the molecules will partially dissolve; and if RED is greater than 1, the molecules will not dissolve.

Figure 2:
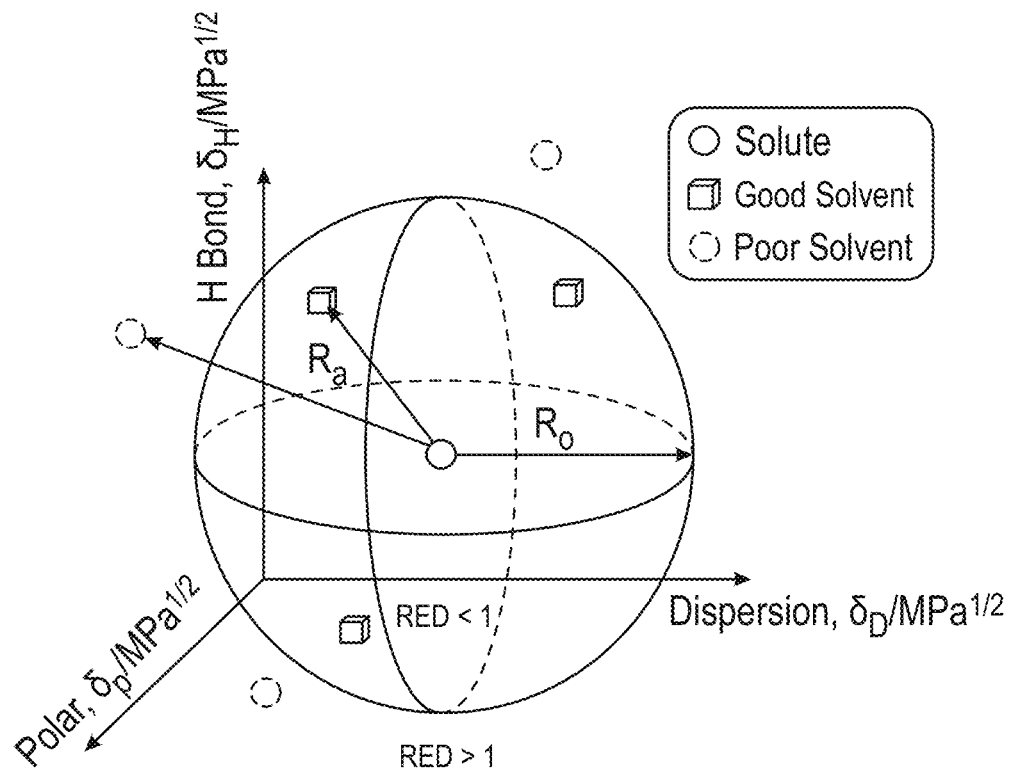
FIG. 2 is a representative Hansen sphere.

Prior art FIG. 2 illustrates a representative Hansen sphere for a given solute plotted in three dimensions based off the solvents' dispersion, polar and hydrogen bonding solubility parameters defined by the calculated Hansen parameters, wherein many of the common solvents are known. Solvents within the boundaries defined by the Hansen sphere are represented by squares, which are indicative of RED being less than 1 whereas the solvents outside the Hansen sphere are represented by circles and are indicative of RED being greater than 1, which is indicative that the solute is not soluble in these solvents.

The usefulness of the above formula (II) is limited to when the solubility parameters (dispersion ($\delta_d$), polar ($\delta_p$), and hydrogen bonding ($\delta_h$)) are known, which is not the case with respect to higher solids loading ceramic colloidal systems used in extrusion based additive manufacturing processes that generally include, in addition to a solvent, a polymeric dispersant, and a ceramic. Applicant has found that HSP can be used to identify the dispersant (and/or other additive(s)) and a ceramic that will work well together within a particular media through the use of H-NMR measurements to determine the solubility parameters for the dispersant and ceramic in a respective solvent by closely matching the HSP values obtained for the ceramic and dispersant with known HSP values for solvent.

The relative H-NMR relaxation rates of different solvents and dispersants in contact with the ceramic surface are indicative of the relative interaction strength (i.e., affinity) between the specific solvent/dispersant and ceramic particle. Generally, liquids having a strong interaction with a particle surface have a faster H-NMR relaxation rate than liquids with weak interactions. Since strong interactions indicate a high affinity of solvent with the dispersant/ceramic particle, the solvent with the highest enhancement in relaxation rate would be the most suitable for the initial wetting/dispersion process. Moreover, since relative H-NMR relaxation rate may be ranked from good solvent to poor solvent, measurement of the T1 relaxation times allows for the calculation of HSPs of the dispersants and the ceramics and further provide an explanation for insolubility and sedimentation in different solvents and dispersants, where indicated.

Generally, the H-NMR relaxation measurements are fast, direct and non-invasive. The total amount of sample needed is advantageously low, typically less than 0.1 milliliter (ml). H-NMR relaxation works by measuring the extent of molecular motion as the hydrogen nuclei are subtly perturbed by local and external magnetic interactions. Liquids and solids behave differently. In liquids, the spin-spin relaxation is slow wherein for solids it is extremely fast, which helps differentiate the two relaxation rates.

The dispersants utilized in the ceramic suspensions wet and disperse the ceramic powders in media and provide rheology control. Dispersants can be used to modify viscosity, provide a narrow particle distribution by reducing agglomeration, and provide a stable suspension.

For convenience, reference herein will be made to zirconium oxide, $ZrO_2$, given its broad use throughout the ceramic community with application ranging from catalysis, dental implants, and high temperature coatings as well as its common use in extrusion-based additive manufacturing processes. However, the present disclosure is equally applicable to other ceramics including, but not limited to silicon nitride, tantalum carbide, and the like. Moreover, although dispersants are important consideration in ceramic suspension stability, the process can be applied to other additives. Likewise, dual solvent systems can be utilized in the present disclosure.

In the present disclosure, conventional techniques related to ceramic extrusion additive manufacturing processes for forming the three-dimensional specimen layer-by-layer on a substrate may or may not be described in detail herein. Moreover, the various tasks and process steps described herein can be incorporated into a more comprehensive procedure or process having additional steps or functionality not described in detail herein. Various steps in the additive manufacture of three-dimensional articles, for example, are well known and so, in the interest of brevity, many conventional steps will only be mentioned briefly herein or will be omitted entirely without providing the well-known process details. Likewise, the robotic workstations as described herein and conventional techniques related to operating the robotic workstation for autonomous mechanical testing of specimens including the load cells and end effectors may or may not be described in detail herein for similar reasons.

For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof. Additionally, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

Spatially relative terms, e.g., "beneath," "below," "lower," "above," "upper," and the like, can be used herein for ease of description to describe one element or feature's relationship to another element(s) or feature(s) as illustrated in the figures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

As noted above, Applicant's process for predicting ceramic suspension stability generally includes measuring H-NMR T1 relaxation times on solvent (ceramic and solvent) and solutions (dispersant and solvent). These T1 values are then used to calculate the relaxation rates ($R_{rate}$) and relaxation numbers ($R_{no}$) as discussed above for different solvents using the inverse of the T1 relaxation times. In accordance with the process for determining HSP for the solvents and solutions, scores are assigned based on the relaxation number ($R_{no}$). Larger $R_{no}$ values have lower assigned scores and are indicative of higher stability whereas lower $R_{no}$ have higher assigned scores and are indicative of lower stability. The HSP are generated and the resulting values are utilized to formulate stable suspensions by closely matching the solvents' dispersion, polar and hydrogen bonding solubility parameters defined by the calculated Hansen Solubility parameters. As previously noted, many of the solvents have known HSP values and are used to calculate the HSP values of the additive and ceramic particles using the HSPiP software.

Examples

By way of example, suspensions of zirconium ($ZrO_2$) powders having different diameters were evaluated in various dispersants and solvents. The average particles size diameters of 99.9% pure $ZrO_2$ were 100, 500 and 800 nanometers (nm).

In general, the samples were mixed and loaded into a 5 millimeter (mm) NMR tube. A Magritek Spinsolve benchtop NMR was used to collect T1 measurement for the HSP analysis, which was done using HSPiP software. Rheology measurements were collected on a Haake RheoWin 4.41 for comparing the results from the H-NMR and sedimentation experiments.

Three series of samples with the three $ZrO_2$ powders having different diameters. Each powder was mixed in a water medium with one of three common dispersants at 1 wt %, 3 wt %, 5 wt % and 7 wt % with respect to the mass of $ZrO_2$. The dispersants included Darvan 811 (sodium polyacrylate) from Vanderbilt Minerals, Dolapix CE 64 (ammonium salt of polymethacrylic acid) from Zschimmer & Schwarz, and branched polyethylenimine (PEI) having a molecular weight of about 25,000 from Millipore-Sigma. Deionized water was used as the water medium and cylindrical zirconia (YSZ) grinding media from Inframat was used to assist with mixing. Active dispersant was determined via the quoted weight percent solids loading with respect to the technical literature provided by the vendor. The volume percent of $ZrO_2$ remained constant at 10 volume percent within each sample so that the samples would remain fluid enough to be loaded into the NMR tube. In all cases the water and the dispersant were mixed together prior to the addition of $ZrO_2$. However, the PEI dispersant was diluted to 20% deionized water in view of its high viscosity. The sample slurries were mixed at 450 revolutions per minute (rpm) for 30 seconds with a small amount of YSZ milling media to facilitate mixing. Table 1 below details the composition of the different slurries.

TABLE 1

ZrO$_2$ (10 wt %)

| | Active Dispersant (wt %) | Water (g) | Dispersant (g) |
|---|---|---|---|
| Darvan 811 | 1 | 9.89 | 0.147 |
| (43 wt %) | 3 | 9.66 | 0.440 |
| | 5 | 9.44 | 0.734 |
| | 7 | 9.21 | 1.027 |
| Dolopix | 1 | 9.92 | 0.097 |
| CE 64 | 3 | 9.76 | 0.291 |
| (65 wt %) | 5 | 9.60 | 0.485 |
| | 7 | 9.43 | 0.680 |
| PEI | 1 | 9.74 | 0.316 |
| (20 wt %) | 3 | 0.21 | 0.947 |
| | 5 | 8.68 | 1.578 |
| | 7 | 9.16 | 2.209 |

The NMR samples were prepared immediately after mixing to prevent/minimize sedimentation, which can impact HSP measurement. In the event the ZrO$_2$ fell out of suspension within the NMR tube, the sample was remixed in a vortex mixer. Bulk samples were stored for later testing for sedimentation and rheology measurements. These samples were remixed at 450 rpm for 30 seconds immediately prior to analysis.

Figure 3:
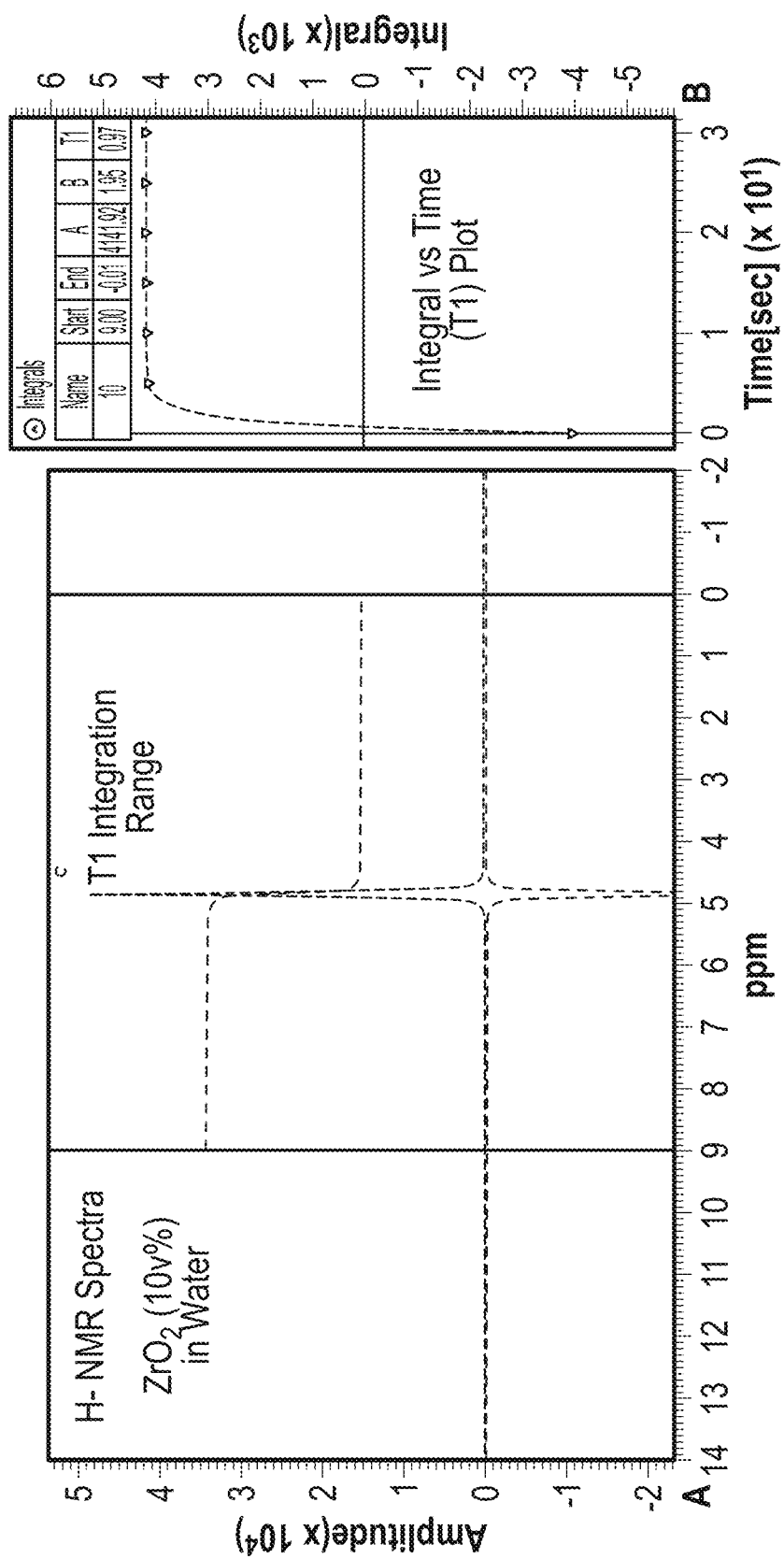
FIG. 3 graphically illustrates a proton nuclear magnetic resonance spectra and T1 plot of an aqueous suspension of $ZrO_2$ in accordance with one or more embodiments of the present disclosure.
Figure 4:
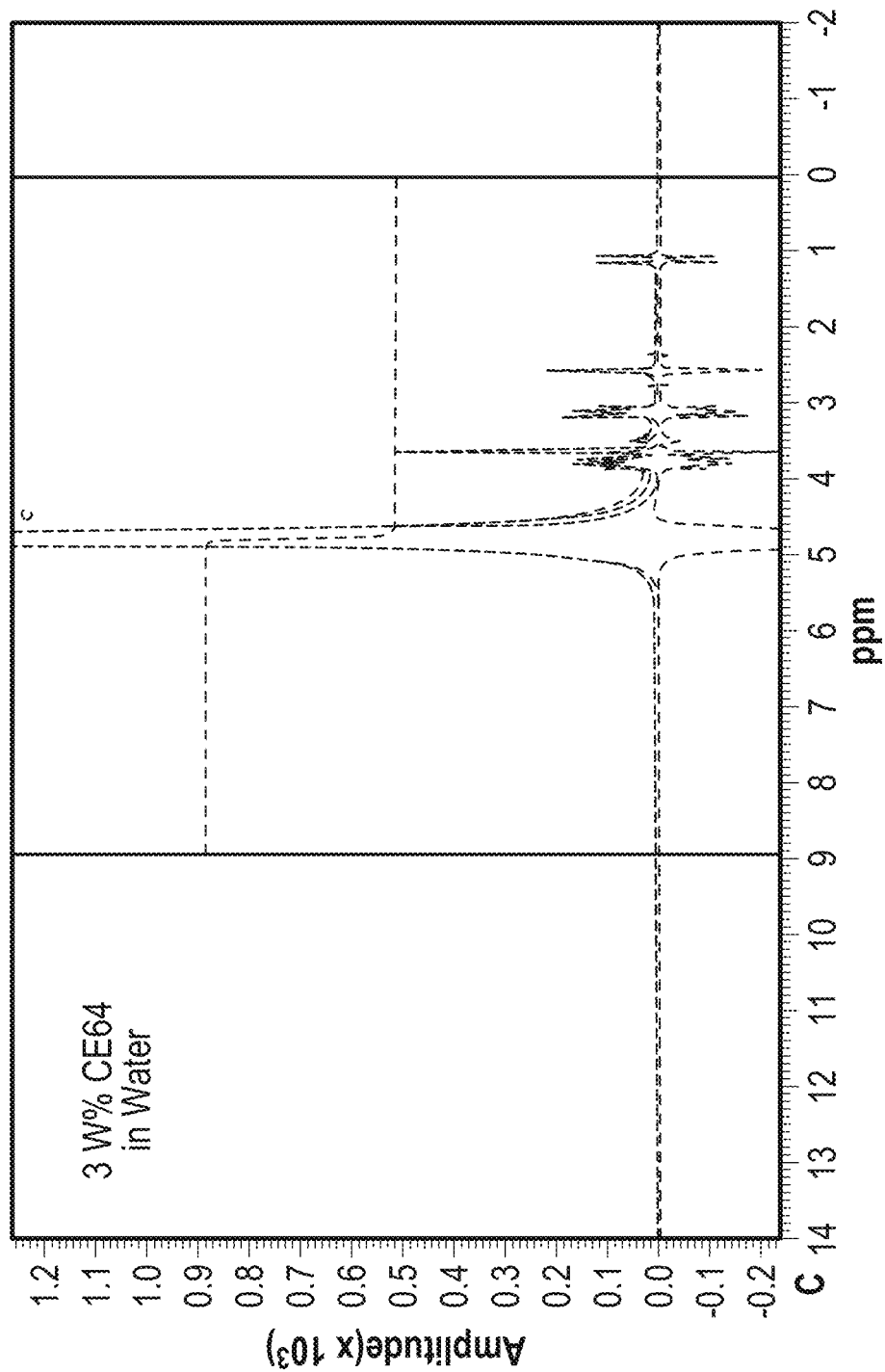
FIG. 4 graphically illustrates a proton nuclear magnetic resonance spectra of an aqueous suspension of Dolapix CE 64 (ammonium salt of polymethacrylic acid) in accordance with one or more embodiments of the present disclosure.

For T1 measurements of the samples, the experimental H-NMR parameters generally included: scans-2, acquisition time 3.2 s, repetition time-20 s, maximum inversion time-10 s, dummy scan s-2, and number of steps 7. Per the number of steps, the inversion time increases up to the maximum inversion time outputting a spectrum at each step. The integral of the spectrum was plotted with respect to the inversion time, which yielded a curve that plateaued over time. From this, the T1 value was extracted from the time it took to reach the plateau. In the event the integral versus time plot did not reach a plateau, the maximum inversion time was extended for the sample to return to a relaxed state whereas increasing the number of steps improved resolution of the T1 value, particularly in experiments that plateaued early. In order to compare T1 values for the different dispersants, the solvent peak and the respective dispersant peak were integrated separately. Also, it should be apparent that because ZrO$_2$ does not contain any hydrogens, there were no peaks associated with the presence of the ZrO$_2$. FIG. 3 illustrates a H-NMR spectra (FIG. 3A) and T1 plot (FIG. 3B) for ZrO$_2$ (10 wt %) in water, and FIG. 4 illustrates a H-NMR spectra for Dolapix CE 64 (3 wt %) in water.

The determination of the HSP for different dispersants and zirconia in a pure solvent such as water is based off the T1 values captured in the H-NMR, which are input into the HSPiP software. As noted above, the inverse of the T1 values provides the relaxation rate (R$_{rate}$), which can then be used to determine the relaxation number in accordance with the equation (I), reproduced below.

$$R_{no} = R_{susp}/R_{solv} - 1 \quad (I)$$

The R$_{no}$ can be compared across different solvents, scored (lower is better) and referenced within the HSPiP software. The solvents that were evaluated included methanol, ethanol, 1-octanol, acetone, and water. It should be apparent that additional solvents could be included. The HSPiP software can then calculate the different parameters (i.e., dispersion ($\delta_d$), polar ($\delta_p$), and hydrogen bonding ($\delta_h$) solubility parameters) based on the interaction of the respective solvent and dispersant with the ceramic powder.

In addition to calculation of HSP, sedimentation and rheology were also evaluated, wherein the HSP values can provide an indication of the suspension stability. Although sedimentation can be evaluated in the NMR tubes, larger diameter tubes were used to eliminate potential errors associated with capillary effects, which could influence the rate that the ceramic crashes out from the suspension. By way of example, 5 ml vials can be used and partially filled with the suspension, e.g., 1.5 ml of the sample can be introduced into the vial. Each vial was mixed and then observed over a period of time, e.g., 24 hours and longer if stable. The samples can be periodically photographed to document suspension stability. Relative height measurement is taken initially and periodically to determine a ratio (percentage) as a function of time, wherein the different suspensions can be compared to one another. This sedimentation and rheology characterization can also be the basis of scoring for determining HSP's provided that the measurements are done carefully and quantitatively. This can be readily accomplished by either setting a standardized time for particles to crash out (based on particle size, for example) or measuring the precise time of sedimentation and scoring appropriately.

As for rheology characterization, the samples were run through a rotational ramp method across shear stress of 10$^{-3}$ pascals (Pa) to 10 Pa. The viscosity can be measured at regular intervals, e.g., 100 data points over a two-minute test period. The resulting shear rate can be used to determine the viscosity for each sample, which was measured in centipoise (mPa·s) and provided a measure of the amount of force necessary to move a layer of liquid in relation to liquid.

Turning now to Tables 2 and 3, the T1 values for the dispersant and ceramic in various solvents, and the T1 values as a function of dispersant concentration in water, respectively, are provided.

TABLE 2

| | Pure Solvents | Darvan 811 (5 wt %) | Dolapix CE 64 (5 wt %) | PEI (5 wt %) | ZrO$_2$ (10 v %) |
|---|---|---|---|---|---|
| 1-Octanol | 0.58 | — | — | — | — |
| Ethanol | 2.54 | 2.51 | 2.48 | 2.43 | 1.23 |
| Acetone | 4.43 | 4.48 | 4.76 | 4.35 | — |
| Methanol | 3.39 | 3.30 | 3.02 | 2.47 | 1.85 |
| Water | 3.15 | 2.03 | 2.83 | 2.16 | 0.74 |

— insoluble

TABLE 3

| | Darvan 811 (wt %) | Dolapix CE 64 (wt %) | PEI (wt %) |
|---|---|---|---|
| 1 wt % | 2.83 | 3.02 | 2.84 |
| 3 wt % | 2.73 | 2.93 | 2.41 |
| 5 wt % | 2.03 | 2.83 | 2.16 |
| 7 wt % | 1.86 | 2.74 | 1.94 |
| As Received | 0.17 | 0.08 | 0.78* |

*Due to high viscosity, the PEI solution was diluted to 20 wt %

Figure 5:
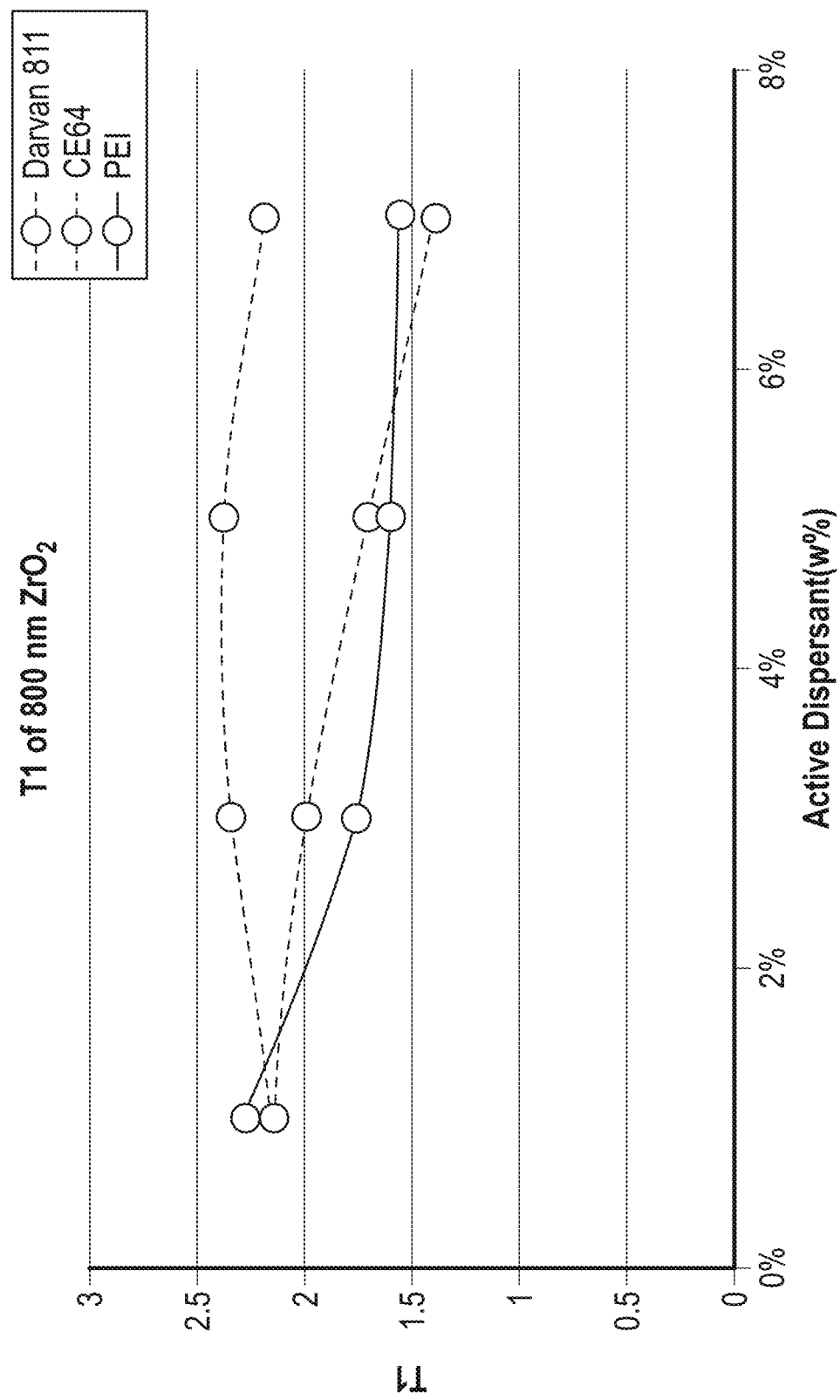
FIG. 5 graphically illustrates T1 values for $ZrO_2$ aqueous suspensions (800 nm particle size) as a function of different active weight percents of a dispersant in accordance with one or more embodiments of the present disclosure.
Figure 6:
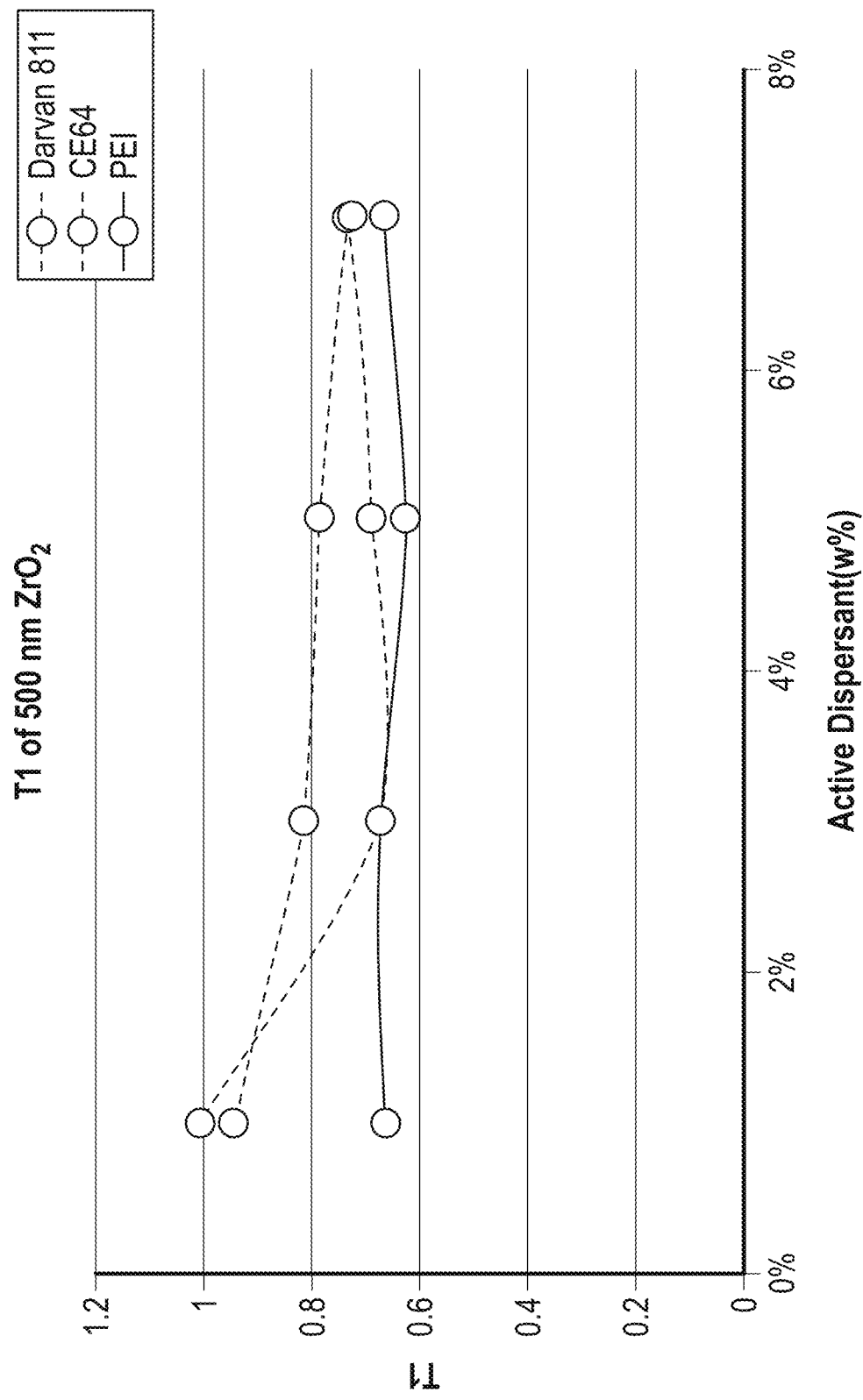
FIG. 6 graphically illustrates T1 values for $ZrO_2$ aqueous suspensions (500 nm particle size) as a function of different active weight percents of a dispersant in accordance with one or more embodiments of the present disclosure.
Figure 7:
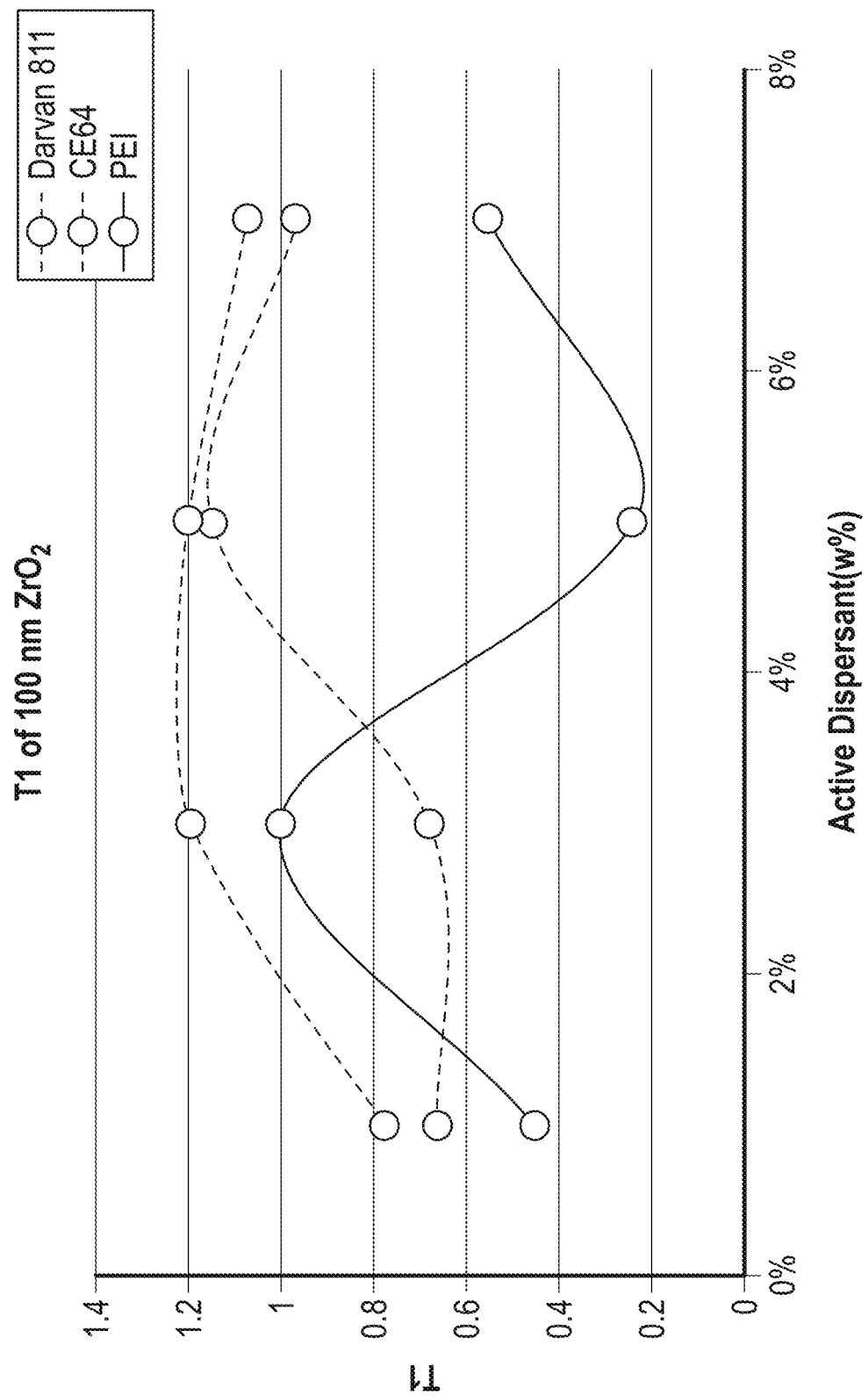
FIG. 7 graphically illustrates T1 values for $ZrO_2$ aqueous suspensions (100 nm particle size) as a function of different active weight percents of a dispersant in accordance with one or more embodiments of the present disclosure.
Figure 8:
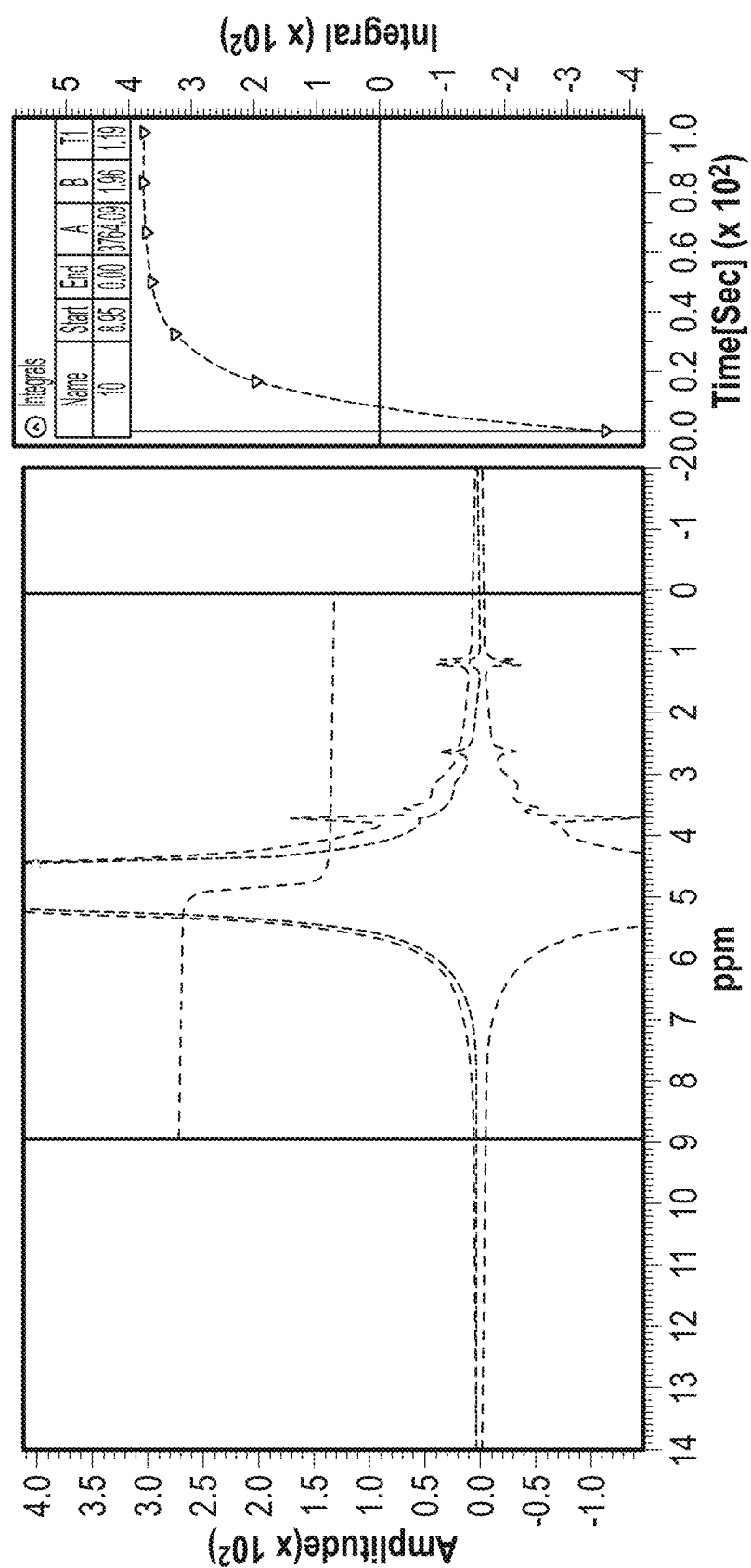
FIG. 8 graphically illustrates a proton nuclear magnetic resonance spectra and a T1 plot of an 10 wt % $ZrO_2$ aqueous suspension with 3 wt % Dolapix CE 64 (ammonium salt of polymethacrylic acid) in accordance with one or more embodiments of the present disclosure.

The T1 values for the dispersant-ZrO$_2$ aqueous suspensions are graphically illustrated in FIGS. 5-7, which correspond to the described mixtures provided in Table 1 above using the 800 nm, 500 nm, and 100 nm diameter ZrO$_2$ powders. As previously discussed above, the inverse of the T1 value represents the R$_{rate}$ and a large R$_{rate}$ is generally desirable. Thus, a lower T1 value is generally preferred and a good predictor of a favorable interaction. To better visualize this, the plots in FIGS. 5-7 are comparing the T1 values with respect to the weight percent of the dispersant. All of these values were extracted from NMR and T1 measurement values such as is shown in FIG. 8, which illustrates the H-NMR spectra and T1 plot for an aqueous suspension of 10 wt % $ZrO_2$ in 3 wt % Dolapix CE 64. However, a comparison with the H-NMR and T1 measurement values of 10 wt % $ZrO_2$ in water and 3 wt % Dolapix CE 64 in water shown in FIGS. 3 and 4, respectively, indicates that the $ZrO_2$-Dolapix CE64-water suspension exhibited broadening of the peaks not seen with the 10 wt % $ZrO_2$ in water (FIG. 3) or the 3 wt % Dolapix CE 64 in water (FIG. 4). Those peaks have broadened and changed, resulting in changes to the integral and thus the T1 value for the suspension.

From the T1 values calculated from H-NMR, HSP values were calculated for the $ZrO_2$ and the different dispersants in the different media via the HSPiP software. Hansen solubility parameters for common solvent compounds (e.g., acetone, methanol, dimethyl sulfoxide (DMSO), toluene, cyclohexane, and the like) are well known and readily available, for example, in the database of software. The calculated solubility parameters for dispersion ($\delta_d$), polar ($\delta_p$), and hydrogen bonding ($\delta_h$) for the solvents (obtained from software database), dispersants and powder are summarized in Table 4 below. The HSP values for the different solvents were known and extracted from a database.

TABLE 4

| Material | Dispersion ($\delta_d$) | Polar ($\delta_p$) | Hydrogen Bonding ($\delta_h$) |
|---|---|---|---|
| Darvan 811 | 15.6 | 18.0 | 38.1 |
| CE-64 | 14.5 | 21.2 | 30.4 |
| PEI | 13.9 | 21.2 | 30.9 |
| $ZrO_2$ | 15.2 | 10.6 | 20.9 |
| Ethanol | 15.8 | 8.8 | 19.4 |
| Methanol | 14.7 | 12.3 | 22.3 |
| Acetone | 15.5 | 10.4 | 7.0 |
| 1-Octanol | 16.0 | 5.0 | 11.2 |
| Water | 15.5 | 16.0 | 42.3 |

Figure 9:
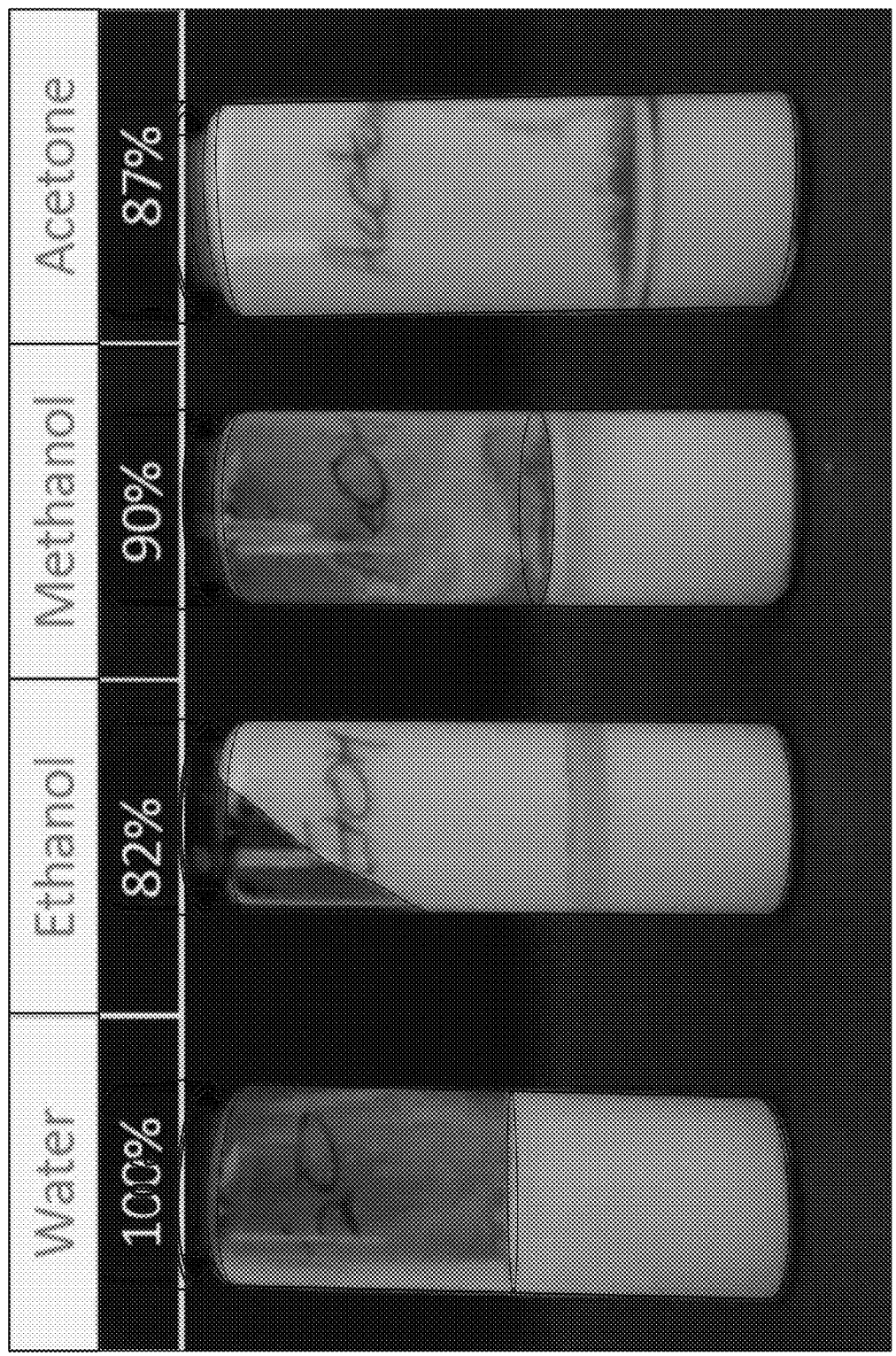
FIG. 9 pictorially illustrates relative height change for 10 wt % $ZrO_2$ suspensions (500 nm particle size) in different solvents subsequent to a sedimentation test in accordance with one or more embodiments of the present disclosure.
Figure 10:
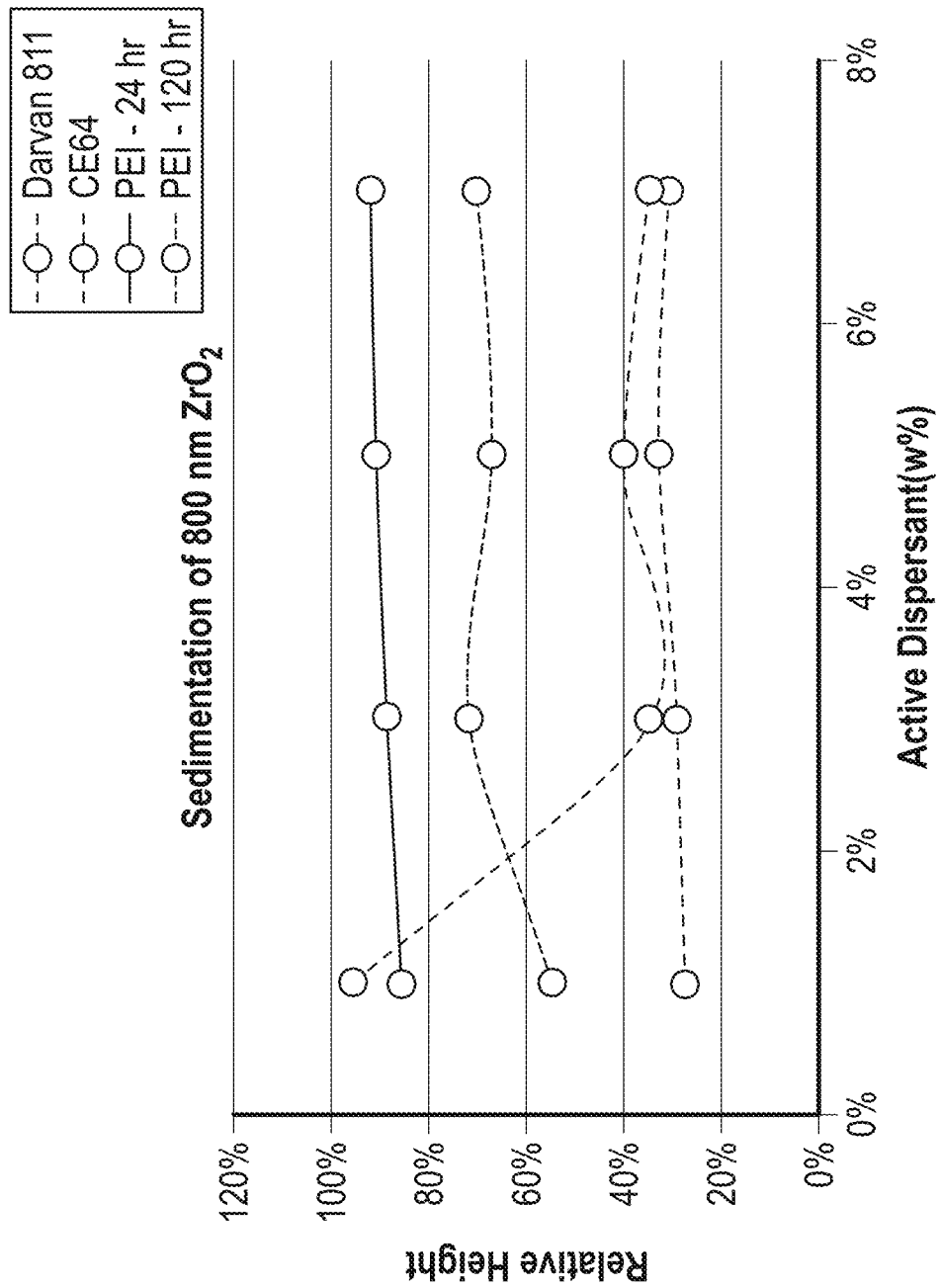
FIG. 10 graphically illustrates relative height change for 10 wt % $ZrO_2$ aqueous suspensions (800 nm particle size) as a function of different active weight percents of a dispersant in accordance with one or more embodiments of the present disclosure.
Figure 11:
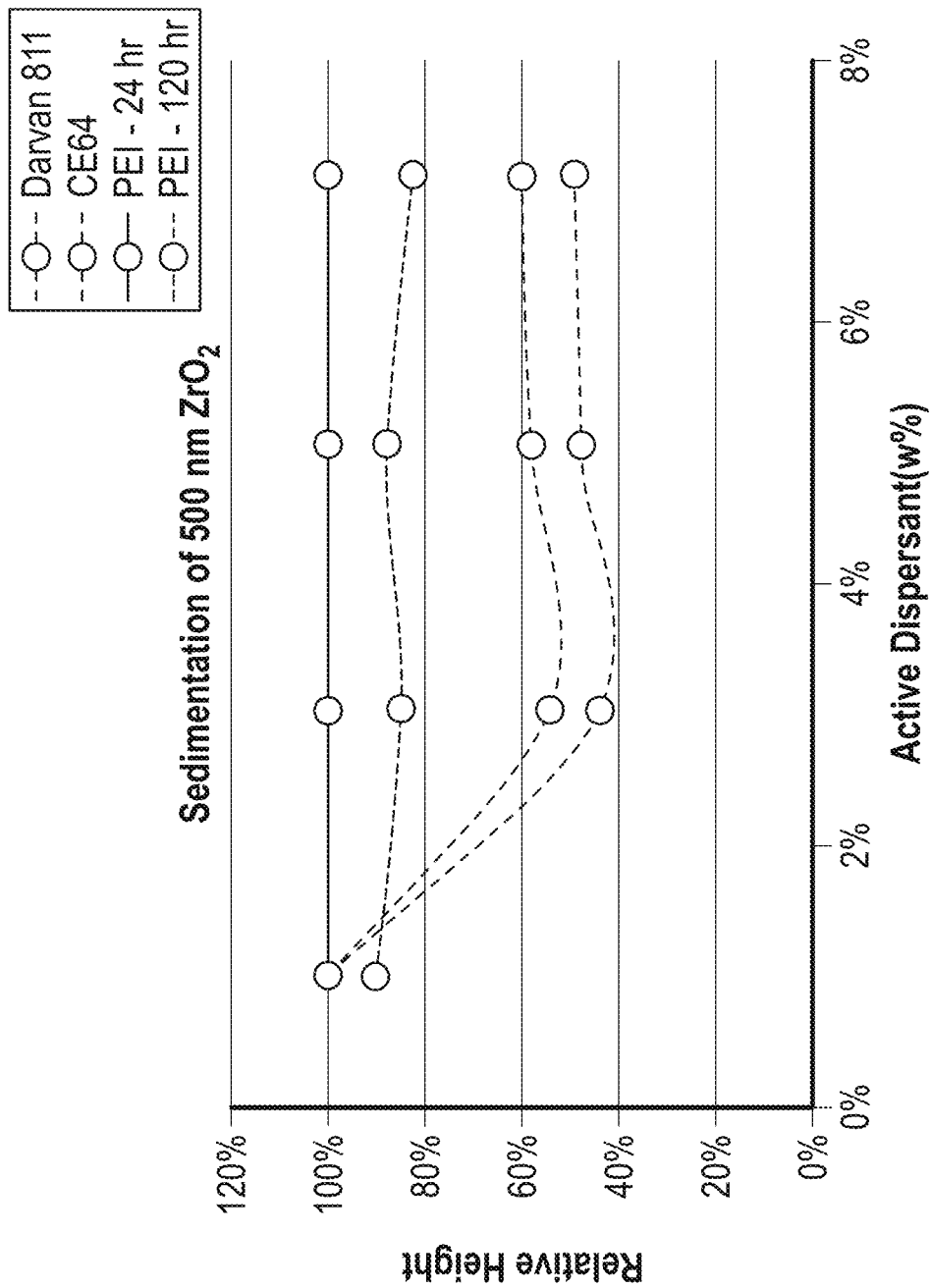
FIG. 11 graphically illustrates relative height change for 10 wt % $ZrO_2$ aqueous suspensions (500 nm particle size) as a function of different active weight percents of a dispersant in accordance with one or more embodiments of the present disclosure.
Figure 12:
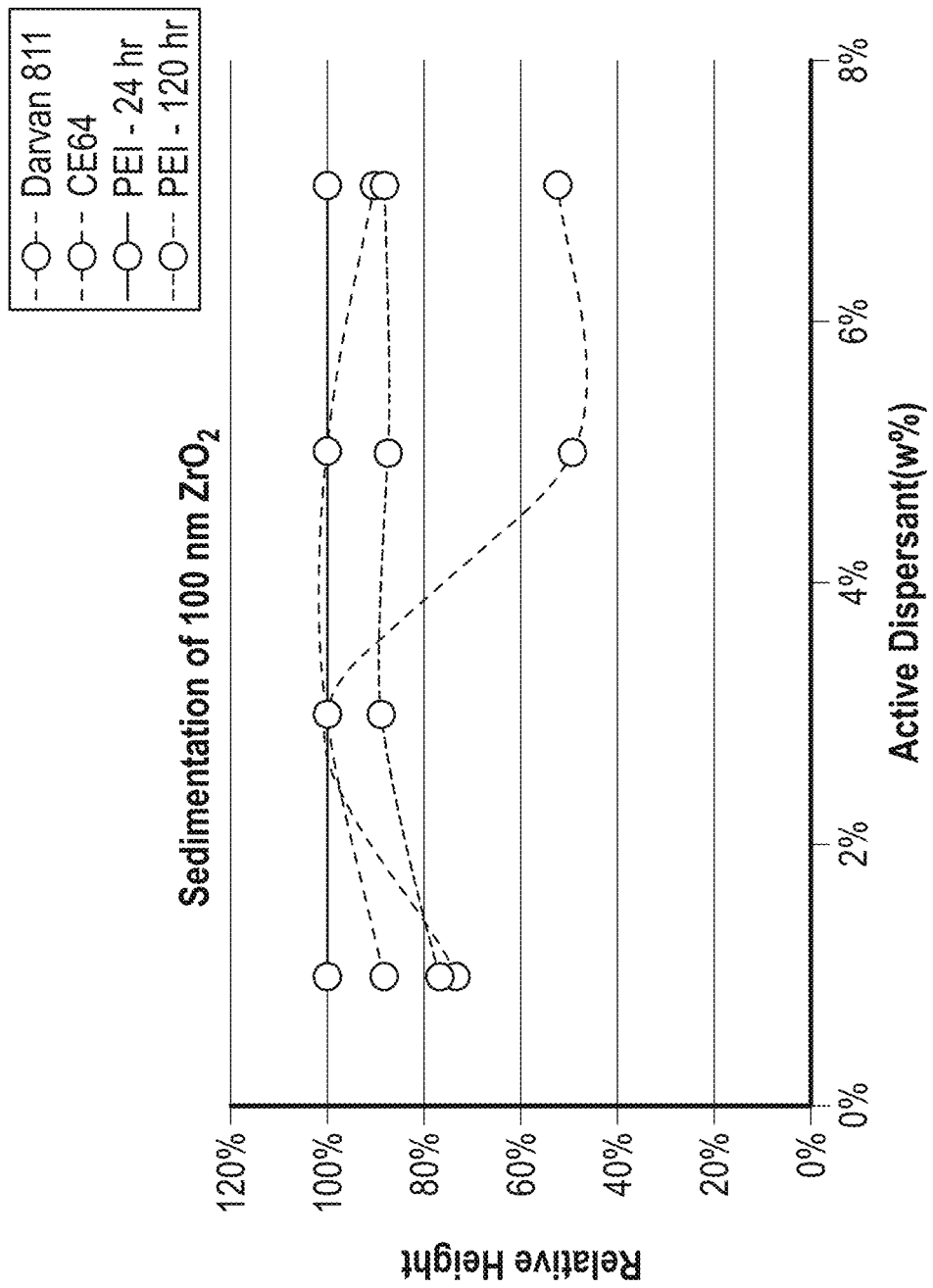
FIG. 12 graphically illustrates relative height change for 10 wt % $ZrO_2$ aqueous suspensions (100 nm particle size) as a function of different active weight percents of a dispersant in accordance with one or more embodiments of the present disclosure.

Sedimentation of the $ZrO_2$ suspensions was then evaluated with the different powders, dispersants, and different active weight percents of the dispersants. FIG. 9 photographically depicts the relative heights of the $ZrO_2$ in a particular solvent, wherein no sedimentation was observed after 48 hours for the $ZrO_2$ in water suspension. Some of the higher vapor pressure solvents that were a poor medium for dispersing $ZrO_2$ deposited powder onto the walls of the tube, which provided some error to the actual volume fraction of $ZrO_2$, which was originally 10 wt %. The relative height measurements were plotted with respect to the active weight percent of the dispersant as shown in FIGS. 10-12 after a period of 48 hours. The PEI suspensions were also evaluated after a period of 120 hours given the minimal sedimentation observed with this dispersant.

Ceramic processing and additive manufacturing require pH adjusters, polymer dispersants, binders, and the like to maintain their shape while also achieving ideal rheology. However, in the present evaluation and based on the like HSP values as shown in Table 5 below, $ZrO_2$ was most stable in water (without a dispersant) with respect to sedimentation (see FIG. 9). While not wanting to be bound by theory, it is believed that vaporization of the non-aqueous solvent may have skewed the HSP values calculated initially, which may be why the R values are lower for ethanol or methanol.

TABLE 5

| Hansen Solubility Parameter | $ZrO_2$ | Water | Ethanol | Methanol | Acetone |
|---|---|---|---|---|---|
| Dispersion ($\delta_d$) | 15.2 | 15.5 | 15.8 | 14.7 | 15.5 |
| Polar ($\delta_p$) | 10.6 | 16.0 | 8.8 | 12.3 | 10.4 |
| Hydrogen Bonding ($\delta_h$) | 20.9 | 42.2 | 19.4 | 22.3 | 7.0 |

Figure 13:
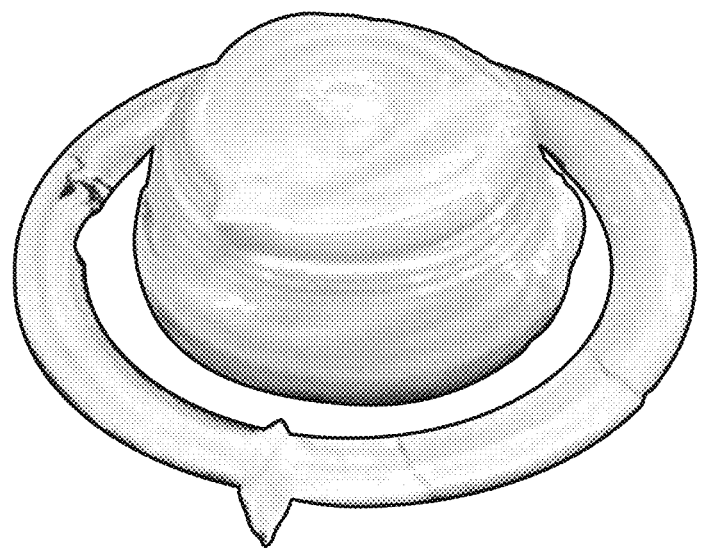
FIG. 13 pictorially illustrates a disc and a concentric ring additively manufactured from a 55% $ZrO_2$ aqueous paste in accordance with one or more embodiments of the present disclosure.
Figure 14:
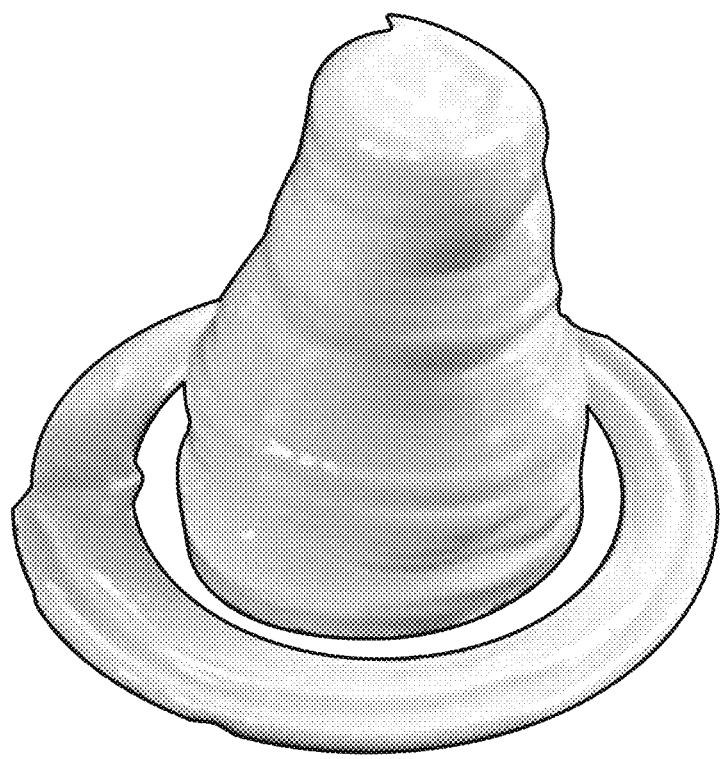
FIG. 14 pictorially illustrates a pillar and a concentric ring additively manufactured from a 55% $ZrO_2$ aqueous paste in accordance with one or more embodiments of the present disclosure.

In view of these findings, a 55% $ZrO_2$ paste (500 nm) was formulated in water only and three dimensionally printed as shown in FIGS. 13 and 14. FIG. 13 pictorially illustrates a disc and a concentric ring about the disc, and FIG. 14 pictorially illustrates a pillar and a concentric ring about the pillar. The $ZrO_2$ concentration was not optimized but additional powder could be added to improve the rheology. The printing of a paste of $ZrO_2$ in water only validates leveraging HSP in the material design process.

Figure 15:
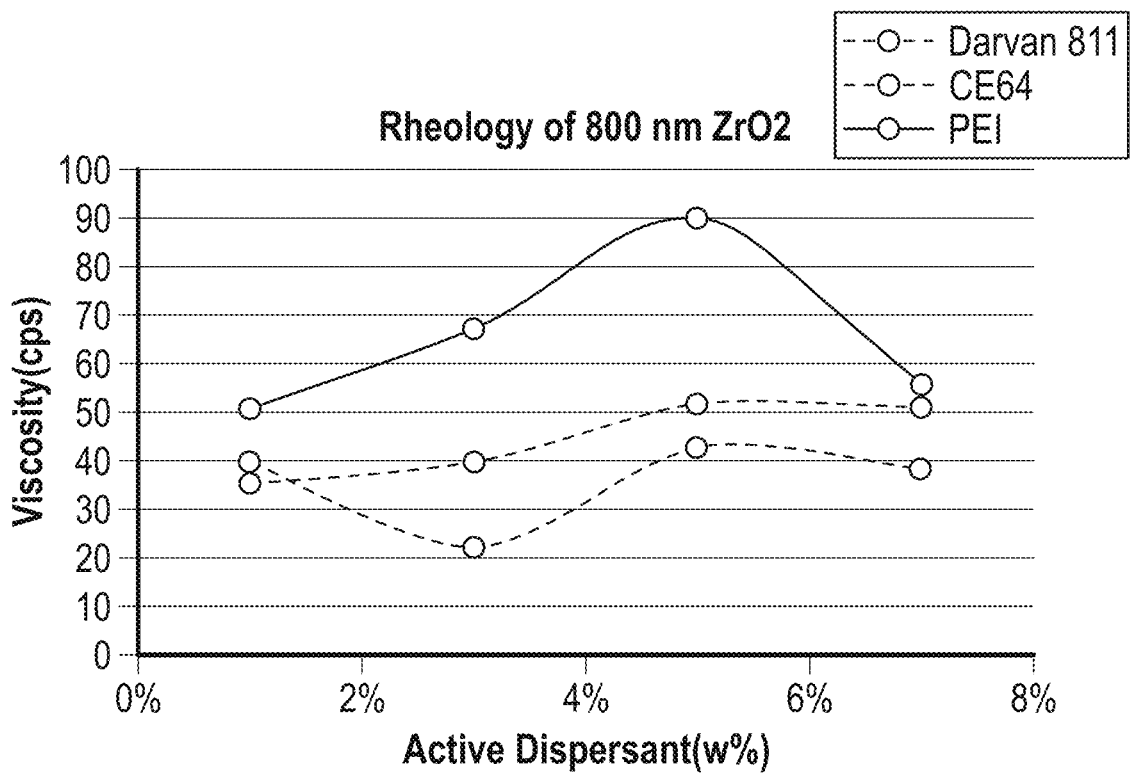
FIG. 15 graphically and pictorially illustrates rheology for 10 wt % $ZrO_2$ aqueous suspensions (800 nm particle size) as a function of different active weight percents of a dispersant in accordance with one or more embodiments of the present disclosure.
Figure 16:
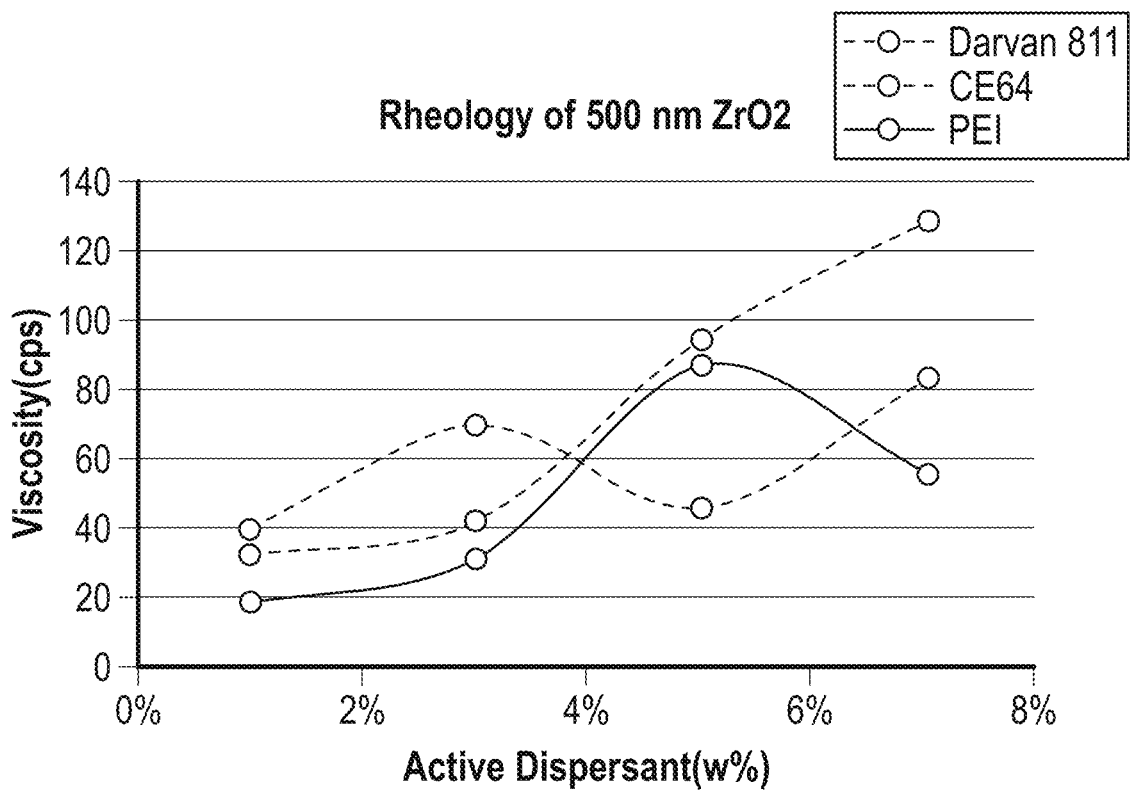
FIG. 16 graphically and pictorially illustrates rheology for 10 wt % $ZrO_2$ aqueous suspensions (500 nm particle size) as a function of different active weight percents of a dispersant in accordance with one or more embodiments of the present disclosure.
Figure 17:
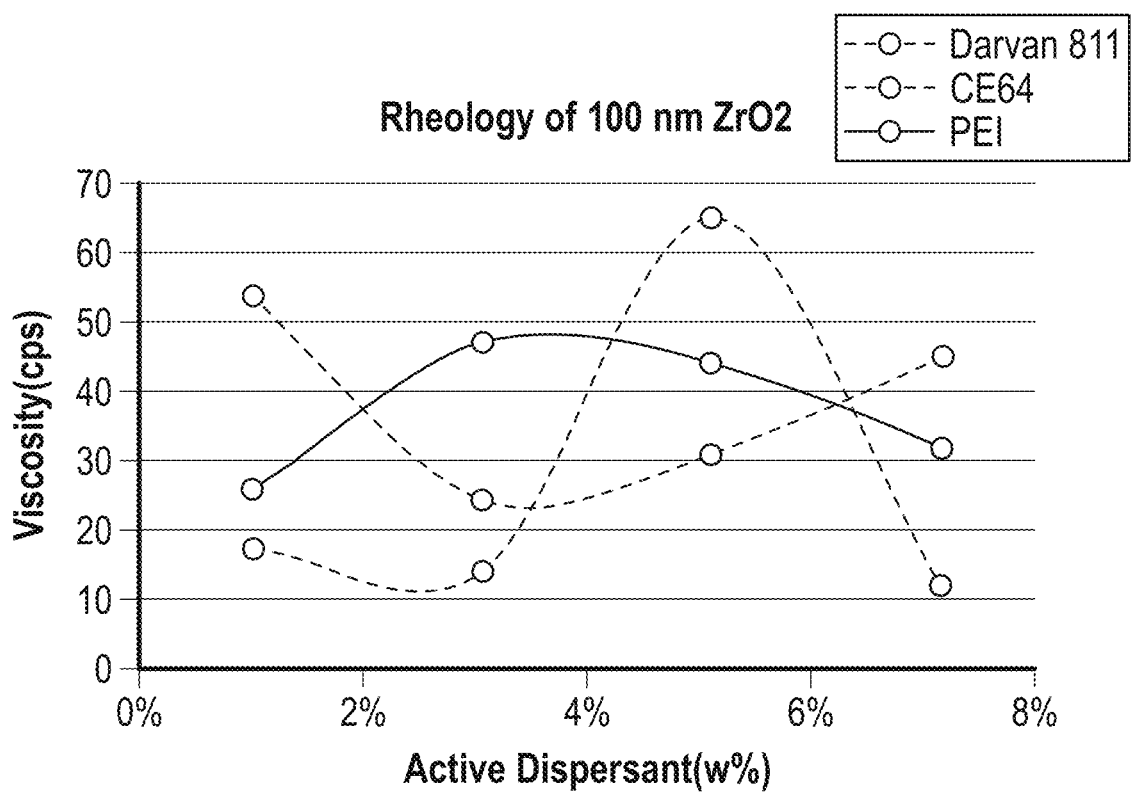
FIG. 17 graphically and pictorially illustrates rheology for 10 wt % $ZrO_2$ aqueous suspensions (100 nm particle size) as a function of different active weight percents of a dispersant in accordance with one or more embodiments of the present disclosure.

In many additive manufacturing processes, the rheology characteristics of the feedstock material provide the ability to shape and print a part. In loaded systems designed as a green body, there is a need for a fine balance between the volume fraction of the powder or filler and pseudoplastic behavior. Ideally, as shear stress increases, the viscosity decreases and the with the right dispersant, this shear thinning effect is pronounced enough to allow for flow through the orifice of a print nozzle. In lower solids loadings, at higher shear stresses, the suspension may look more Newtonian than pseudoplastic. Conversely, if the dispersant is not effective at providing stability and dispersion, the rheology will be more shear thickening due to particle collisions and poor interaction. As a result, when using rheology to qualify the impact a dispersant has on a ceramic, the lower viscosity is more favorable. However, as noted with PEI dispersant, which had the highest viscosity of the three dispersants evaluated as depicted in FIGS. 15-17, the stability was the greatest. That being said, the static yield stress of PEI is likely to become too much to overcome at such a large dispersant weight percent.

As demonstrated in the above experiments, the use of NMR for calculating the HSP values acts as a rapid screening method for dispersants and mixtures. With regard to particle sizes, T1 decreased with the average particle size indicating the smaller the particle size, the greater the stability. This observation correlates with the trend observed with the sedimentation graphically shown in FIGS. 10-12.

Figure 18:
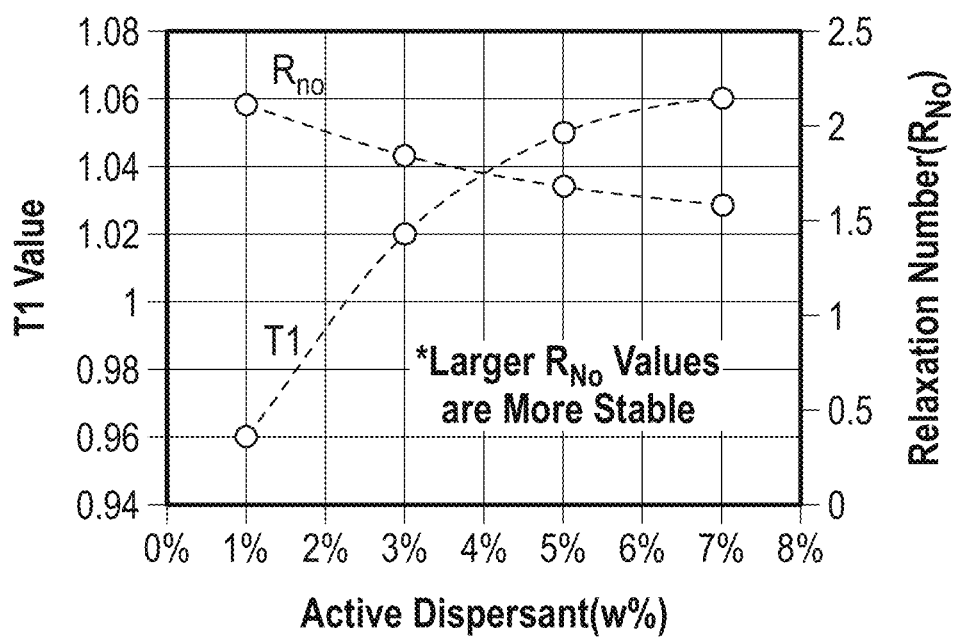
FIG. 18 graphically illustrates T1 values and calculated relaxation numbers ($R_{no}$) for 10 wt % $ZrO_2$ aqueous suspensions (500 nm particle size) as a function of different active weight percents of a Dolapix CE 64 dispersant in accordance with one or more embodiments of the present disclosure.
Figure 19:
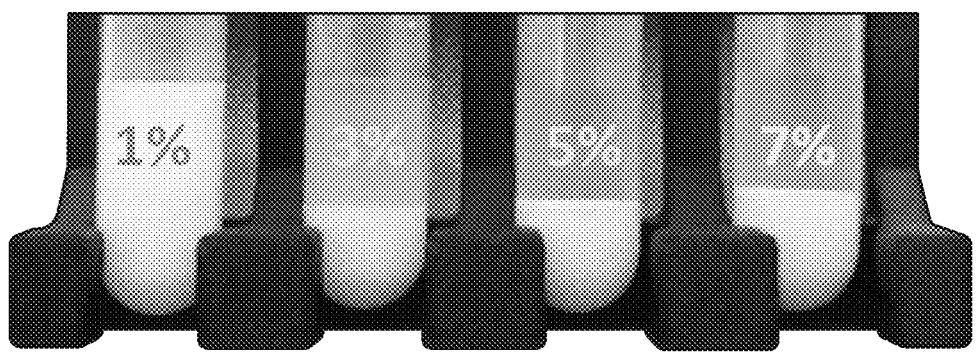
FIG. 19 pictorially illustrates sedimentation for 10 wt % $ZrO_2$ aqueous suspensions (500 nm particle size) as a function of different active weight percents of a Dolapix CE 64 dispersant after a settling period of 48 hours in accordance with one or more embodiments of the present disclosure.
Figure 20:
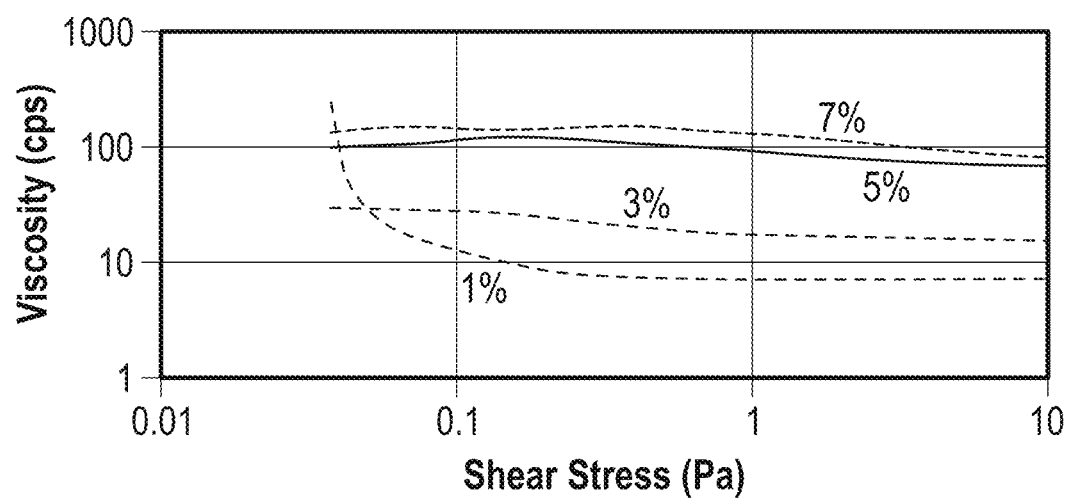
FIG. 20 graphically illustrates rheology behavior for 10 wt % $ZrO_2$ aqueous suspensions (500 nm particle size) as a function of different active weight percents of a Dolapix CE 64 dispersant in accordance with one or more embodiments of the present disclosure.

With regard to the amounts of dispersant in the suspension, FIG. 18 graphically illustrates the T1 values and calculated relaxation numbers ($R_{no}$) for 10 wt % $ZrO_2$ aqueous suspensions (500 nm particle size) as a function of different active weight percents of Dolapix CE 64 dispersant; FIG. 19 pictorially illustrates sedimentation of the same aqueous solutions after a settling period of 48 hours; and FIG. 20 illustrates the rheology behavior. As shown, the calculated relaxation numbers align with the sedimentation and rheology trends as a function of the active weight percent of dispersant. The $ZrO_2$ suspension including 1 wt % Dolapix CE 64 dispersant had the largest $R_{no}$ (lower T1 values) was more stable as evidenced by the sedimentation and rheology data. Regarding the rheology properties, the 1% Dolapix CE 64 suspension has a preferred shear thinning behavior resulting in the lowest viscosity. Stability decreased with an increase in dispersant concentration.

In another example, alpha ($\alpha$), beta ($\beta$), and amorphous (am) powders of silicon nitride ($Si_3N_4$) were mixed in different solvents, loaded into a 5 millimeter (mm) NMR tube, and the T1 relaxation times recorded as previously described. Table 6 summarizes the results including the calculated relaxation number, wherein because of the stability in a larger number of solvents, $\beta$-$Si_3N_4$ was determined to be an ideal candidate for further evaluation.

TABLE 6

| Solvent | $\alpha$-$Si_3N_4$ | $\beta$-$Si_3N_4$ | am-$Si_3N_4$ |
| --- | --- | --- | --- |
| Water | 2 | 2.61 | 2.97 |
| Acetone | — | 4.37 | — |
| Methanol | — | 3.14 | — |
| Ethanol | 2.26 | 2.34 | 2.29 |
| Hexanes | — | — | — |
| Ethyl Acetate | — | 3.11 | — |
| Ethylene Glycol | — | 0.24 | — |
| Isopropyl Alcohol | 1.64 | 1.57 | 1.54 |

— denotes no dispersion stability was observed.

The T1 relaxation times were then used to derive the HSPs using the HSPiP software, which led to multiple viable solvents closely matching the HSP parameters for $\beta$-$Si_3N_4$ as shown in Table 7 below.

TABLE 7

| Solvent | T1 | $\delta_D$ | $\delta_P$ | $\delta_H$ |
| --- | --- | --- | --- | --- |
| $\beta$-$Si_3N_4$ | — | 15.7 | 13.5 | 24.6 |
| Propylene Glycol | 0.13 | 16.8 | 10.4 | 21.3 |
| Dipropylene Glycol | 0.13 | 16.5 | 10.6 | 17.7 |
| 50/50 Acetone/Water | 2.20 | 15.5 | 13.2 | 24.7 |
| 56/44 Methanol/Ethylene Glycol | 1.69 | 15.7 | 11.7 | 23.9 |

As shown above the calculated HSP values for acetone/water cosolvent relative to the HSP values for the $\beta$-$Si_3N_4$ were most closely matched. In fact, the interaction radius (Ra), which is the distance of the solvent to the center of the Hansen sphere for $\beta$-$Si_3N_4$, was calculated to be 0.5, wherein a lower Ra value implies better interactions between the ceramic and the solvent and greater stability. It is noted that the observed T1 values could not be directly compared to one another, otherwise, acetone and water would have been the worst of the four solvents in the above noted table.

Figure 21:
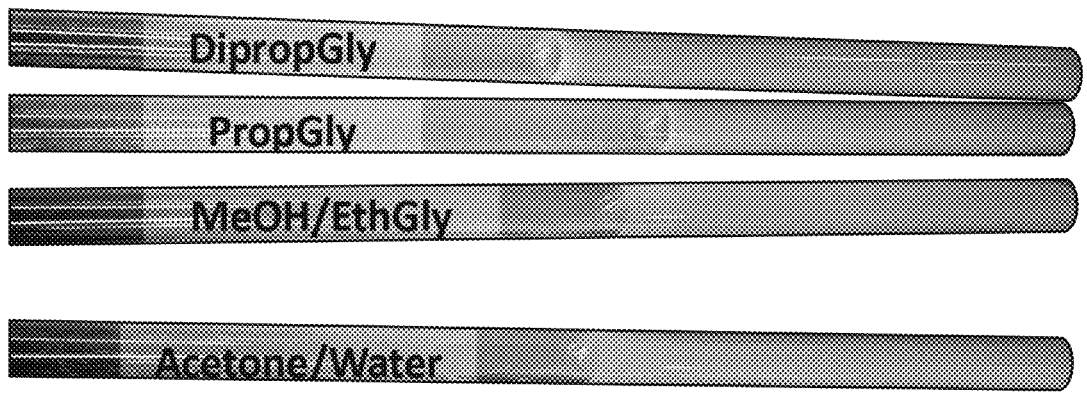
FIG. 21 pictorially illustrates sedimentation for various solvent based $Si_3N_4$ suspensions in accordance with one or more embodiments of the present disclosure.
Figure 22:
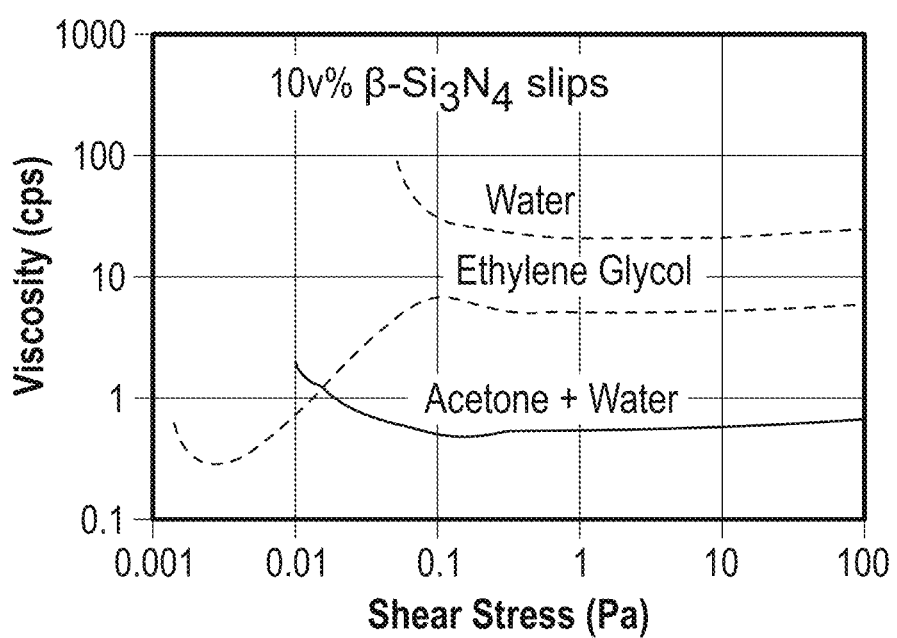
FIG. 22 graphically illustrates viscosity as a function of shear stress for various solvent based $Si_3N_4$ suspensions in accordance with one or more embodiments of the present disclosure.

The greater stability was evident in the sedimentation and rheology testing. FIG. 21 depicts various tubes including $\beta$-$Si_3N_4$ and various solvents. FIG. 22 graphically illustrates viscosity as a function of shear stress for 10% by wt $\beta$-$Si_3N_4$ suspensions in water, ethylene glycol, and a 50:50 acetone/water co-solvent system. As shown, shear thickening was observed for the 10% by volume $Si_3N_4$ suspension in ethylene glycol. Additionally, although the acetone/water mixture most closely matched the HSP for $\beta$-$Si_3N_4$, extrusion of the acetone/water suspension indicated some phase separation, which is likely due to acetone evaporation during the extrusion process leading to uneven extrusion. Further optimization of the solvent system can be expected to provide increased colloidal stability.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A process for selecting an additive and/or solvent for a colloidal ceramic suspension, the process comprising:
    measuring spin lattice T1 relaxation times by nuclear magnetic resonance for a ceramic-solvent pair, and an additive-solvent pair, wherein the solvent is selected from a plurality of different solvents, and wherein the additive is selected from a plurality of different additives;
    determining a relaxation number for each of the ceramic-solvent pairs and the additive-solvent pairs from the spin lattice T1 relaxation times, wherein a higher relaxation number is indicative of strong affinity between the additive and solvent and between the ceramic and solvent; and
    selecting the additive and the solvent based on the relaxation number having the highest relaxation number for the colloidal ceramic suspension.

2. The process of claim 1, wherein the plurality of additives comprises a polymeric dispersant, a defoamer, a pH adjusting agent, and/or a plasticizer.

3. The process of claim 2 further comprising calculating values corresponding to Hansen Solubility Parameters for each polymeric dispersant and/or the ceramic; and matching the Hansen Solubility Parameter values for the polymeric dispersant to the Hansen Solubility Parameter values for the ceramic.

4. The process of claim 3, further comprising selecting the solvent by matching a known Hansen Solubility Parameter for the solvent to the Hansen Solubility Parameter for the ceramic.

5. The process of claim 3, wherein the ceramic is zirconium oxide, silicon nitride or tantalum carbide.

6. The process of claim 3, wherein the polymeric dispersant with the highest relaxation number has a lower sedimentation rate than the polymeric dispersant with a lower relaxation number.

7. The process of claim 1, wherein the ceramic in different ceramic-solvent pairs have different average particle size diameters.

8. The process of claim 1, further comprising selecting a solvent and/or an additive having Hansen Solubility Parameter values that provide a lower interaction radius about the Hansen Solubility Parameter value for the ceramic relative to the other additives or other solvents.

9. The process of claim 1, wherein the other additives are at different concentrations relative to the selected additive.

10. The process of claim 1, wherein the ceramic in each of the ceramic-solvent pairs have a different particles size relative to one another.

11. The process of claim 1, wherein measuring spin lattice T1 relaxation times by nuclear magnetic resonance comprises proton nuclear magnetic resonance.

12. A process for selecting solvents and/or additives in a ceramic colloidal suspension for an extrusion based additive manufacturing process, the process comprising:
    measuring T1 relaxation times for mixtures comprising different solvents or additives with a ceramic by proton nuclear magnetic resonance, wherein each mixture comprises a ceramic-solvent pairing or a ceramic-additive pairing or a ceramic-additive-solvent pairing;

determining a relaxation rate and a relaxation number for each mixture from the T1 relaxation times and ranking the relaxation numbers for each mixture based on an observed interaction, wherein the ranking for the observed interaction of a strong affinity has a lower rank than the observed interaction of a weaker affinity;

calculating Hansen Solubility parameter values for the ceramic and each additive from the T1 relaxation times; and selecting the solvent and/or additive based on the respective Hansen solubility parameter value most closely matching the Hansen solubility parameter value for the ceramic.

13. The process of claim 12, wherein selecting the solvent comprises accessing a database of known Hansen solubility parameter values for the solvent and most closely matching the Hansen solubility parameter values of the solvent to the Hansen solubility parameter value for the ceramic.

14. The process of claim 12, wherein lower T1 relaxation times for the ceramic-solvent pairing or the ceramic-additive pairing have a stronger interaction with the ceramic than higher T1 relaxation times.

15. The process of claim 12, wherein the additive comprises a polymeric dispersant, a defoamer, a pH adjusting agent, and/or a plasticizer.

16. The process of claim 12 further comprising aligning the T1 relaxation times and relaxation numbers with sedimentation and rheology behavior, wherein lower T1 relaxation times and larger relaxation numbers increased stability of the colloidal ceramic suspension.

17. The process of claim 12, wherein the stable ceramic colloidal suspension has a ceramic content greater than 50% by weight.

18. The process of claim 12, wherein the solvent most closely matching the Hansen solubility parameters value to the Hansen solubility parameter value for the ceramic is a solvent mixture.

19. The process of claim 12, wherein the extrusion based additive manufacturing process is a direct ink write process.

20. The process of claim 12, wherein the additive is in an amount from greater than 0 to about 5 weight percent.

* * * * *